Patented May 25, 1937

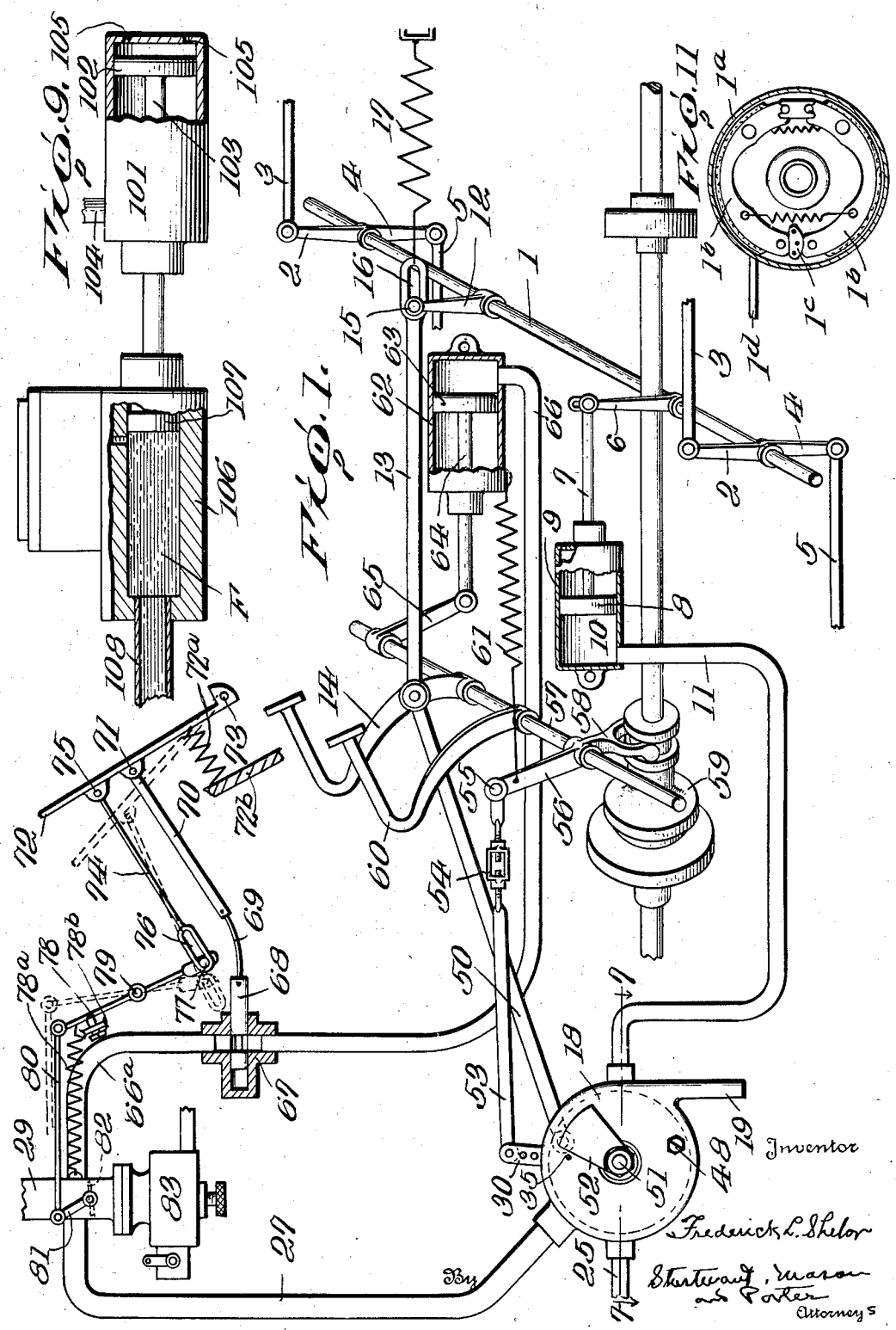

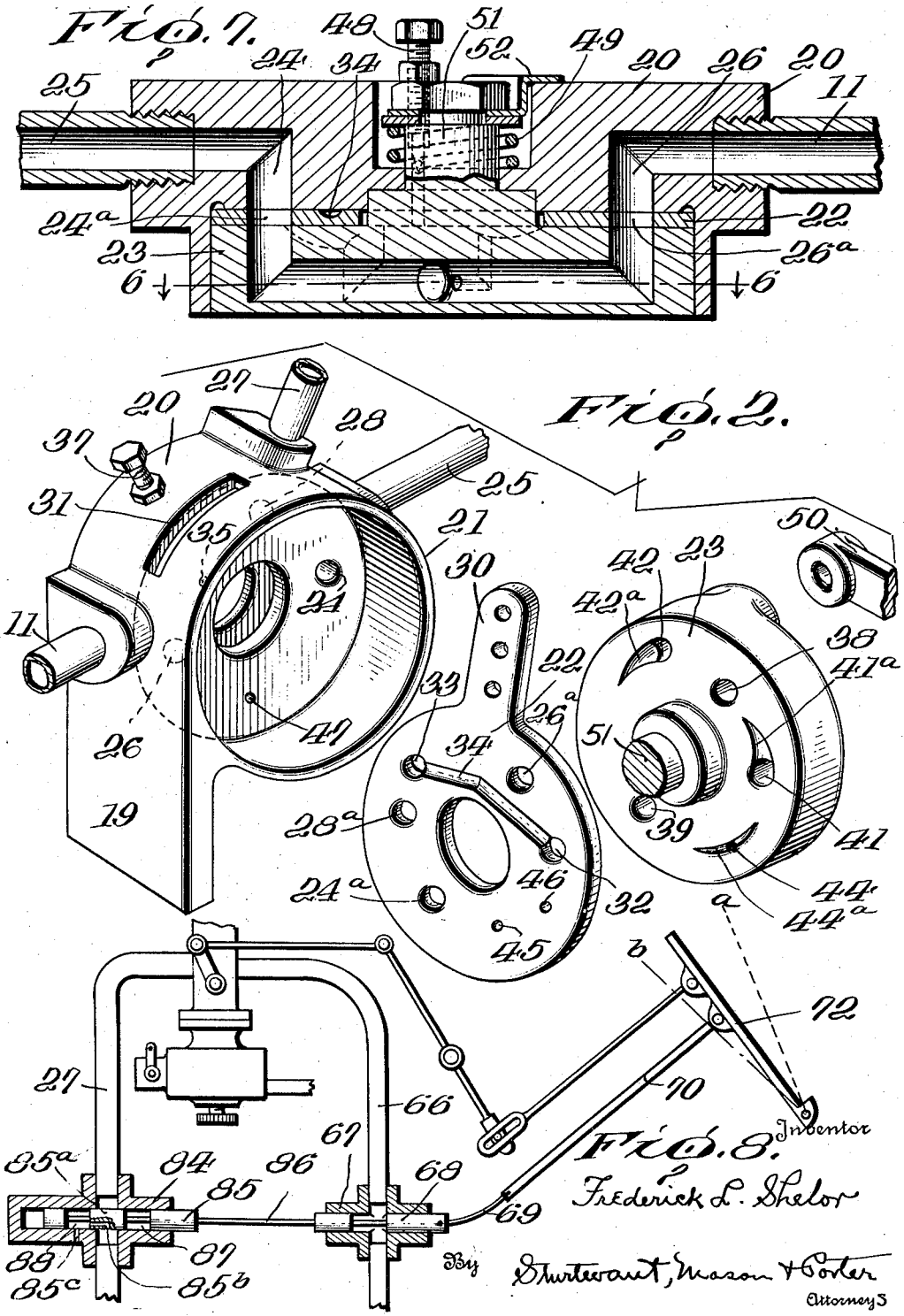

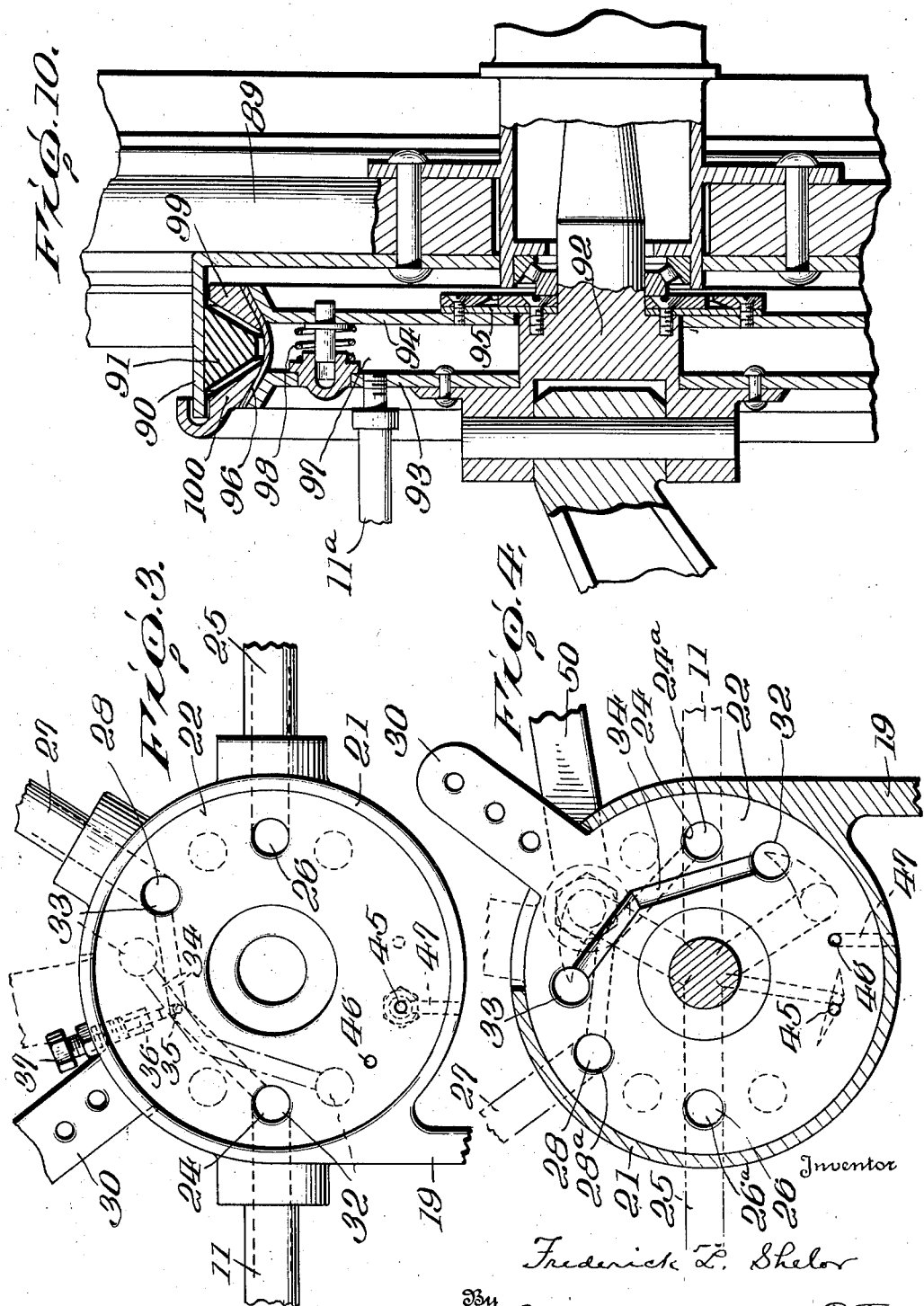

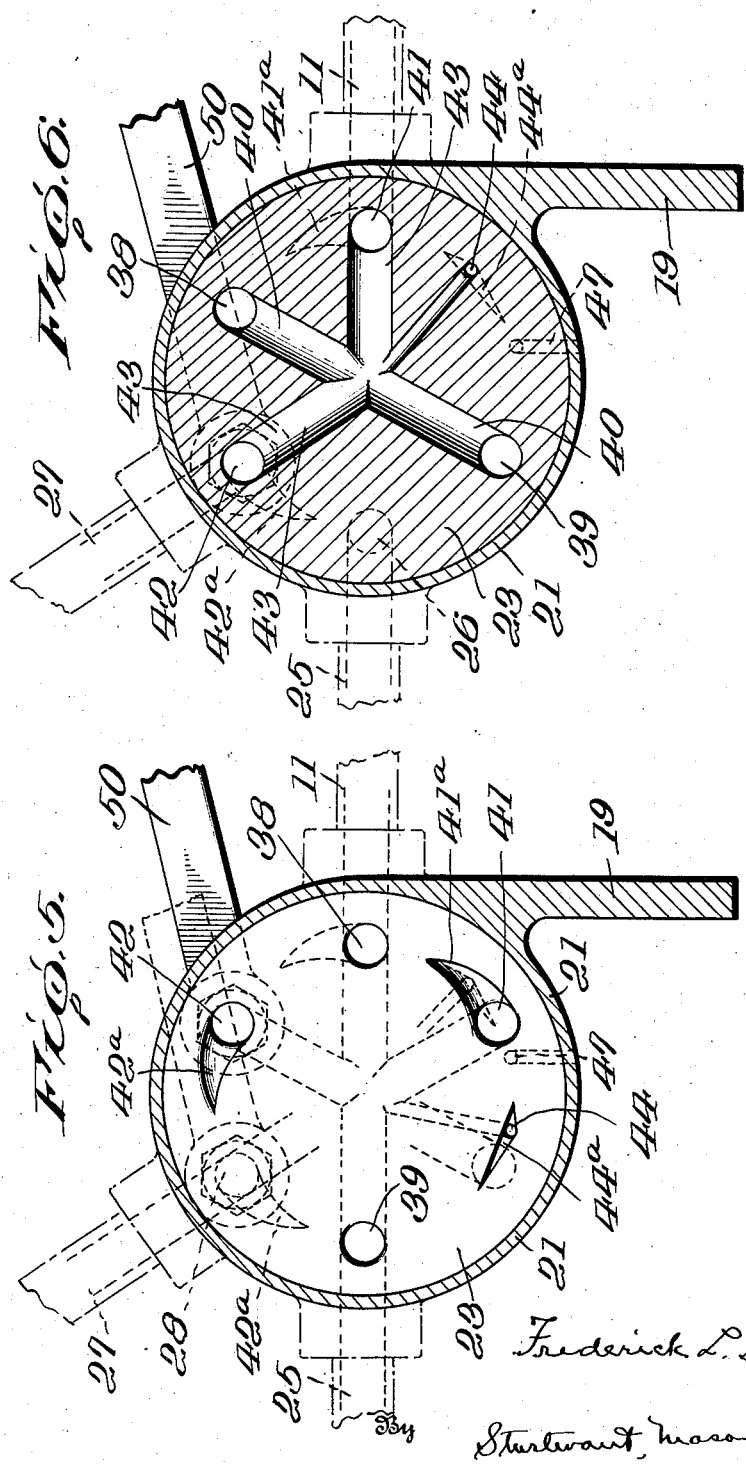

2,081,254

UNITED STATES PATENT OFFICE 2,081,254

BRAKING MECHANISM FOR AUTOMOBILES

Frederick L. Shelor, Richmond, Va., assignor to Innovation Brakes, Inc., Richmond, Va., a corporation of Virginia Application March 8, 1933, Serial No. 660,052

9 Claims. (Cl. 192—.01)

The invention relates to new and useful improvements in a braking mechanism for automobiles.

An object of the invention is to provide an auxiliary brake controlling means whereby a brake pressure may be applied and released through a movement of the foot-operated accelerator lever.

A further object of the invention is to provide a braking mechanism of the above character wherein the application of the brakes is obtained by a differential pressure produced by the vacuum on the intake manifold.

A still further object of the invention is to provide a braking mechanism of the above character which may be used in connection with an automatic clutch operating mechanism, wherein both the braking mechanism and the clutch operating mechanism are controlled by a movement of the foot-operated accelerator lever.

A still further object of the invention is to provide a combined brake and clutch control of the above type which may be operated in sequence by the foot-operated accelerator lever, so that the clutch may be opened prior to the application of the braking pressure.

These and other objects will in part be obvious and will in part be hereinafter more fully disclosed.

In the drawings—

Figure 1 is a view showing more or less diagrammatically the essential features embodying the invention;

Fig. 2 is a perspective view of the brake controlling mechanism, the parts being separated to show the structure thereof;

Fig. 3 is a front view of the brake controlling means with the main control valve disk removed;

Fig. 4 is a sectional view through the brake controlling means in rear of the auxiliary control disk and looking in the opposite direction from that viewed in Fig. 3;

Fig. 5 is a view through the brake controlling means showing the main control valve disk as viewed from the rear side thereof;

Fig. 6 is a sectional view through the brake controlling means and centrally through the main valve disk;

Fig. 7 is a horizontal central sectional view through the brake controlling means;

Fig. 8 is a view showing more or less diagrammatically a modified form of control means for the braking mechanism;

Fig. 9 is a view partly in section showing diagrammatically a modified form of brake operating mechanism, Fig. 10 is a vertical sectional view through one of the wheels and showing one form of brake applying means, and Fig. 11 is a detail showing more or less diagrammatically one form of mechanically operated braking means.

The invention is directed broadly to an improvement in the braking mechanism for an automobile. It includes, in the present illustrated embodiment of the invention, a braking means which is brought into action by a differential pressure produced by the vacuum in the intake manifold. There is a control valve which applies and releases the braking means. This control valve includes a main control valve disk and an auxiliary control valve disk. The main control valve disk is operated solely by a brake pedal of the usual type, and when this disk is shifted, the brake pressure may be applied and the degree of pressure applied is determined by the extent to which the brake pedal is depressed. The auxiliary control valve disk applies a brake pressure of a lesser degree than the main valve disk and is controlled in its movements by a foot-operated accelerator lever. This auxiliary valve disk is actuated by a clutch shifting shaft, and the clutch shifting shaft is in turn actuated either manually or automatically. When operated automatically, it is controlled by the foot-operated accelerator lever. The clutch may be disconnected simultaneously with the application of the braking pressure in one form of the invention, and in another form, the clutch may be first released before the brake pressure is applied. The main control valve disk may be operated while the auxiliary brake is applied, and an additional braking pressure created on the braking means.

It is thought the invention will be better understood by a detail description of the illustrated embodiments thereof. In Fig. 1 of the drawings, there is illustrated an operating means for the conventional form of mechanical means used on the automobile. The shaft 1 carries arms 2, 2 which are connected through links 3, 3 with the braking means at the rear wheels. This shaft 1 also carries arms 4, 4 which are connected by links 5, 5 with the braking means at the front wheels of the automobile. Mounted on the shaft 1 is an arm 6 connected to a piston rod 7 carrying a piston 8 sliding in a closed cylinder 9. In this cylinder is a chamber 10 and a pipe 11 connected with a vacuum creating means which produces a vacuum on the chamber 10, causing the piston 8 to move to the left, as shown in Fig. 1, and thus apply the brakes. This is a conventional showing of one form of brake applying means controlled by a differential pressure on a movable member. The shaft 1 is also provided with an arm 12 connected to a link 13, which link 13 is pivoted to a foot pedal 14 of the usual type, and this permits the braking means to be applied manually through a depressing of the foot pedal. There is a pin 15 on the link 13 moving in a slot 16 with the link, and this permits the brakes to be applied through the use of the vacuum controlled means without depressing the pedal. A spring 17 connected to the link and the abutment on the vehicle holds the pedal in raised position.

The pipe 11 is connected to a control valve 18. This control valve 18 is shown in detail in Figures 2 to 6. Said control valve consists of a standard 19 which is rigidly attached to the chassis carrying a casing 20. Said casing has a forwardly projecting flange 21 forming a cylindrical chamber in which is located an auxiliary control valve disk 22 and the main control valve disk 23. Said casing 20 is provided with a port 24 connected to the pipe 11 and opening at the back wall of the cylindrical chamber. A pipe 25 is also connected to the casing 20 and leads to a port 26 likewise opening at the back wall of the chamber. This pipe 25 opens to the atmosphere and is preferably connected to the muffler. Likewise connected to said casing is a pipe 27 from which a port leads to an opening 28 in the back wall of the chamber. This pipe 27 is connected to the intake manifold 29 (see Fig. 1). An auxiliary valve-controlled disk 30 is inserted in the casing 21 and the projecting arm extends through the slot 31 in the casing. This slot is of sufficient width and the disk of such size relative to the diameter of the casing that the end of the arm may be placed in the slot and the disk slipped into place before inserting the control valve disk 23. The auxiliary valve control disk is provided with openings 24a, 26a and 28a which are in register with the openings 24, 26 and 28, respectively, when this auxiliary valve is set in its off position, and that is with the arm 30 at the left-hand end of the slot 31 in the casing, as viewed in Fig. 2. When said arm is turned to the other end of the slot, then the openings 32 and 33 will be brought into register with the openings 24 and 28. There is a channel 34 connecting the openings 32 and 33, and in this setting of this auxiliary valve disk, the pipe 11 is connected to the pipe 27, and thus it is that the intake manifold is connected to the chamber 10 and will draw a vacuum thereon. This creates differential pressure on the piston head 8, moving the piston to the left through atmospheric pressure thereagainst, and causing the brake pressure to be applied by the braking means. The extent of the braking pressure will be determined by the amount of differential pressure on the piston head, and in turn by the degree of vacuum on the chamber 10.

There is an opening 35 through the casing 20 leading to the atmosphere which registers with this channel 34 when the disk is in the on position. The size of this opening is controlled by a needle valve 36 which in turn is controlled by a threaded bolt 37 carrying a needle valve which may be locked in set positions. By varying the size of this vent opening 35 to the atmosphere, the degree of vacuum on the chamber 10 can be varied. The auxiliary disk when shifted to set position, will cause a vacuum of a predetermined degree to be placed on this chamber 10, and a brake pressure of substantially a predetermined degree applied to the wheels through the braking means. For reasons which will be described later, this brake pressure is less than the maximum brake pressure which may be applied for controlling the vehicle.

The main valve control disk 23 is provided with openings 38 and 39 which are normally in register with the openings 24 and 26, respectively, when this valve disk is in its off position. These openings lead to the center of the valve and are connected by radially extending channels 40, 40. In this off position of the valve disk 23, the pipe 11 is connected to the pipe 25, and thus it is that the chamber 10 is opened to the atmosphere. This will cause an equal pressure on opposite sides of the piston head 8 and the brake releasing springs will open the braking means. This is assuming, however, that the auxiliary valve disk 22 is likewise set in off position, with the openings 24a and 26a in register, respectively, with the openings 24 and 26. When the valve disk 23 is in off position and the auxiliary valve disk 22 returned to off position, this will release the brake pressure so that the auxiliary disk may be shifted from on to off position, applying the brakes and releasing the brakes, as desired, without shifting the main valve disk 23.

The valve disk 23 is provided with openings 41 and 42 which extend into the disk and are cross-connected by channels 43 extending radially of the valve disk. Adjacent the opening 41 there is a tapering groove 41a which terminates at a point, and adjacent the opening 42 is a similar tapering groove 42a. When the valve disk is turned so as to cause the openings 41 and 42 to move into register with the openings 24a and 28a in the auxiliary valve disk 22, there will be a gradual connection of the pipe 11 to the intake manifold through the pipe 27. The degree of opening of these ports will depend upon the setting of this main valve disk 23. If the auxiliary valve disk 22 is in off position, then the openings 24a and 28a are in register with the openings 24 and 28, respectively, and the openings 41 and 42 of the main control valve disk will be brought into gradual registration with the openings 24a and 28a. When, however, this auxiliary disk 22 is in on position with the openings 32 and 33 in register with the openings 24 and 28, then the openings 41 and 42 will move gradually into registration with these openings 32 and 33, respectively, and thus an increased brake pressure is obtained, for the reason that in addition to the cross-connecting channel 34 joining the openings 32 and 33, there are also the cross channels 43 now connecting the openings 32 and 33, the extent of which is controlled, as noted, by the amount of shift of the valve disk 23 and the extent to which the openings 41 and 42 are brought into register with these openings 32 and 33.

There is also an opening 44 in the valve disk 23 which has vanishing grooves 44a at each side thereof on the inner face of the valve disk 23. This opening 44 is adapted to be moved into register with an opening 45 in the valve disk 30, when said valve disk is in its off position, or an opening 46 in the valve disk, when said valve disk is in on position, and these openings 45 and 46 are adapted to register, respectively, with the opening 47 through the casing leading to the atmosphere and controlled by a valve member 48. The valve disks are held seated in the casing by a spring 49. This valve for controlling the degree of vacuum on the chamber 10 is shown, described and claimed in detail in my co-pending application Serial No. 611,205, filed May 13, 1932. There is, however, a slightly modified arrangement of openings so that the main valve may be brought into action regardless of whether the auxiliary valve disk is in on or off position. This enables the auxiliary valve disk to be shifted for applying a brake pressure such as may be obtained thereby, and then, without releasing this auxiliary brake pressure, the main valve disk may be shifted so as to add thereto and bring about a maximum brake pressure that can be obtained. The main valve disk can also be shifted and bring about this main brake pressure when the auxiliary valve disk is in off position and without manipulating the same. The main valve disk is connected to a link 50 which in turn is connected to the brake pedal 14. The purpose of the link 13 is to bring the brake pedal to its raised position and the main valve disk to off position when said brake pedal is released.

Mounted on the shaft 51 which is attached to the main valve disk 23 is a shutter 52 which closes the opening 35 when the main valve disk is moved to apply the brakes. This cuts off the venting of the port 34 and enables a maximum brake pressure to be applied.

The arm 30 of the auxiliary valve disk is connected to a link 53 having a turn buckle 54 therein, whereby the length of the link may be changed. The link at its other end is pivoted at 55 to an arm 56 attached to the shaft 57 which operates the clutch mechanism. The arm 56, as shown, is extended to provide a fork 58 operating on the clutch member 59 which may be of any desired construction. When the shaft 57 is turned in a counter-clockwise direction, the clutch will be released. At this time, the arm 30 is shifted so as to bring the channel 34 into connection with the openings 24 and 28, and thus it is that a braking pressure is applied or determined by the extent of vacuum created on the chamber 10 when the clutch is thrown to open position. Likewise, when the clutch is closed through the turning of the shaft 57 in a clockwise direction, the auxiliary control disk is moved to off position and the braking pressure is released.

The shaft 57 may be moved for releasing the clutch by a pedal 60. A spring 61 connected to the arm 56 normally holds the shaft 57 turned so as to close the clutch, and the clutch is opened against this spring pressure when the shaft 57 is turned. An automatic means is diagrammatically illustrated for opening the clutch. This clutch opening means includes a cylinder 62. In this cylinder is a piston 63 connected to a piston rod 64. The left-hand end of the cylinder is vented to the atmosphere. The piston rod 64 is connected to an arm 65 which is fixed to the shaft 57. A pipe 66 leads from the cylinder to the intake manifold through the control valve 67. When the control valve is open, then a differential pressure is created on the piston 63 which will cause said piston to move to the right, and this will turn the shaft 57 in a counter-clockwise direction, opening the clutch. The control valve 67 includes a rigidly supported casing which is connected to the pipe 66 and which is also connected through a pipe 66a with the manifold 29. Within this valve casing is a valve piston 68, and this valve piston is connected through a Bowden wire or other flexible member 69 to a bar 70 which is pivoted at 71 to the foot-operated accelerator lever 72. This foot-operated accelerator lever is of the usual construction and is pivoted for turning movement about a center 73. A spring 72a bears against an abutment 72b and against the accelerator lever 72 and normally turns said accelerator lever to the full line position shown in Fig. 1. A link 74 pivoted at 75 to the foot-operated accelerator lever has a slotted end 76 adapted to receive a pin 77 on a lever 78 which is pivoted at 79. This lever 78 is connected to a link 80 which in turn is attached to the arm 81 connected to the butterfly valve 82 in the manifold leading to the carburetor 83. Connected to the lever 78 is a spring 78a which normally turns the butterfly valve to a closed position. The stop 78b limits the movement of the lever 78 under the action of the spring 78a when the butterfly valve reaches a position for idling. This stop may be adjusted for varying the idling position. These parts are all diagrammatically shown, as they are of the usual construction. The foot-operated accelerator lever is shown in Fig. 1 in its fully raised position, and it is adapted to be depressed to the broken line position as shown in said figure. When it is depressed to a slight distance, it will shift the valve 68 so as to close the valve, and thus cut off the vacuum connection to the cylinder 62 and establish a connection to the pipe 66. This will create an equal pressure on opposite sides of the piston 63 and the spring 61 will throw the clutch into closed position. This movement of the shaft 57 which closes the clutch, also releases the brake. As shown in Fig. 1, the clutch is closed substantially simultaneously with the releasing of the brake. After the clutch is closed and the brake released, further depression of the foot-operated accelerator lever toward the broken line position will accelerate the engine in the usual manner. When pressure on the foot-operated accelerator lever is released, the usual spring will return the same to raised position, and this will cause the valve 67 to be opened. After the engine has been decelerated to idling position, the opening of the valve 67 will create a vacuum in the cylinder 62 and a differential pressure on the piston 63, which will cause the shaft 57 to be turned in a counter-clockwise direction, releasing the clutch and applying the brake. The braking mechanism described is particularly adapted for a motor vehicle containing a free wheeling clutch, wherein the vehicle is gravitationally propelled, running free of the engine under certain conditions. The operator may decelerate the engine substantially to an idling position, without applying the brake, and the vehicle will run unrestrained in free wheeling. Upon releasing the foot-operated accelerator lever so as to disconnect the clutch, the braking pressure is applied which, as noted, is of a less braking pressure than the main braking pressure that is utilized when it is desired to quickly stop the vehicle. This braking pressure may be adjusted, and it is preferably set so that a vehicle running on the level and moving at the usual speed of travel, will stop in a space of approximately fifty feet. By this particular setting of the auxiliary braking pressure, the operator of the vehicle can readily slow up the vehicle running in free wheeling by fully releasing the foot-operated accelerator lever, and by slightly depressing the same, the brake pressure can be released at any time, so that the vehicle is under perfect control, although it is in free wheeling, and this is all accomplishined through the manipulation of the foot-operated accelerator lever.

In Fig. 8, of the drawings, there is shown a slightly modified form of the invention which permits the clutch and the brake to be operated in sequence under the control of the foot-operated accelerator lever. The valve 67 is of the same construction as that described above, and is connected through the flexible member 69 and the bar 70 with the accelerator lever 72. In the pipe 27 is a valve casing 84 in which a piston valve 85 operates. This piston valve 85 is connected by a flexible member 86 with the piston valve 68 and is moved by the foot-operated accelerator lever. The piston valve 85 has a port 87 therein which opens the pipe connection 27 and a port 88 therein which likewise opens the pipe connection 27. In the form shown in Fig. 1, the pipe connection is continuously open. The central section 85ª of the piston valve has a port 85ᵇ therein, and when this section 85ª is in position for closing the pipe connection 27, the lower section of the pipe 27 leading to the control valve 18 will be opened to the atmosphere through this port 85ᵇ and the port 85ᶜ in the valve casing. This insures the releasing of the brakes when the vacuum connection is cut off from the control cylinder, and without any shifting of the auxiliary valve to off position. The auxiliary valve is in on position when the valve 67 is open, but this closing of the pipe connection 27 renders the auxiliary braking means ineffective. The purpose of this valve is to close the pipe 27 at certain times. When the accelerator lever is in fully raised position, then the port 88 opens the pipe 27, and the valve 67 opens the pipe 66. Both of the pipes are, therefore, connected to the intake manifold, and this results in a throwing of the clutch to open position, and also to the applying of the brakes. The raised position of the accelerator lever is indicated by the broken line a in Fig. 8, and it is at this time that both valves are open as stated. When, however, this foot-operated accelerator lever is moved to the full line position shown in Fig. 8, then the pipe connection 27 is closed. This cuts off the vacuum connection for the control valve for the braking system and releases the brake. The pipe connection 66, however, is still open, and therefore, the clutch is held in disengaged position through a differential pressure created on the piston 63. A still further downward movement of the foot-operated accelerator lever to the broken line position b (Fig. 8) will close the pipe connection 66 and cause the clutch to close, and from this point on, the accelerator lever can be depressed for accelerating the engine. As soon as the valve 67 is closed, thus permitting the spring to close the clutch, the port 87 comes into alinement with the sections of the pipe 27 and establishes a connection through this pipe 27 with the manifold. This insures that the operator, if desired, may shift the main brake disk and apply the brakes, even while the clutch is in and the engine being accelerated. Therefore, the main brake pressure accomplished by depressing the brake pedal 14 is available for operation at all times, except when the auxiliary pedal is held slightly depressed and with the clutch released. It is through this valve in the pipe connection 27 operated by the accelerator lever that the sequence of operations may be obtained so that the engine may be decelerated to idling speed, the clutch then opened, and free wheeling accomplished with open clutch without applying any brake, and upon further release of the accelerator lever, a limited braking pressure may be applied to the vehicle for retarding and controlling the speed thereof.

In Fig. 11 of the drawings, there is shown diagrammatically one member of the braking means. It consists of a brake drum 1ª within which are brake shoes 1ᵇ, 1ᵇ controlled by a cam 1ᶜ carried by the shaft which is attached to a rod 1ᵈ, and this rod is in turn connected to or formed as a part of one of the links 3, 3 or 5, 5.

In Fig. 10 of the drawings, a different form of braking means is illustrated. In this form of the invention, the wheel 89 is provided with a brake drum 90 on the inner face of which is a braking member 91. Attached to the axle spindle 92 is a disk 93. Mounted for lateral movement relative to the disk 93 is a disk 94. This disk 94 is connected by a flexible member 95 to the axle spindle, and the two disks are connected by a flexible member 96, thus forming a closed chamber 97. The pipe 11 leading from the control valve is connected to a suitable header, and this header is in turn connected to pipes 11ª, one for each wheel, when there is a braking means applied to each wheel. This provides a means whereby the chamber 97 is placed under vacuum and a differential pressure created on opposite sides of the disk 94. The two disks are separated by a spring 98 and are moved toward each other by this differential pressure. The disk 94 carries a brake shoe 99 and the disk 93 carries a brake shoe 100. The brake shoe 99 contacts with the braking member 91 and moves the same into engagement with the brake shoe 100. This braking means is shown, described and claimed in my co-pending application Serial No. 572,705, filed November 2, 1931, and further detail description thereof is not thought necessary. This braking means is operated through the control valve in precisely the same way as the mechanically actuated braking means controlled by the vacuum on the chamber 10.

In Fig. 9 of the drawings, there is shown a further modified form of braking means wherein the braking pressure is transmitted to the braking means at the wheels by a fluid pressure. In this form of the invention, there is a cylinder 101 in which is located a piston 102 connected to a piston rod 103. A pipe 104 is connected to the pipe 11 so that a vacuum is created in the cylinder at the left of the piston 102. There are vent holes 105 in the head of the cylinder so that the right-hand end of the piston is continuously subjected to atmospheric pressure. A differential in the pressure on the piston will cause the piston rod to move to the left as viewed in Fig. 9. The piston rod extends into a cylinder 106 and is connected therein to a piston 107. This cylinder contains a fluid indicated by the broken lines F. A pipe 108 leads from the cylinder 106 to the wheels where there is a braking means controlled by the fluid delivered thereto under pressure. When the chamber in the cylinder 101 is placed under vacuum, and the piston 102 moved to the left, it will force the fluid to the braking means and thus apply the brakes. When, however, the vacuum is cut off, then the pressure on opposite sides of the piston 102 will be equalized, and the springs controlling the braking means will release the brake, returning the fluid to the cylinder 106.

While the air vent for the control valve 85 is a desirable feature as the air pressure on the vacuum chamber is at once released, it will be understood that this is not absolutely essential for the reason that the air vent 35 which limits the degree of vacuum on the vacuum chamber will in a very short time develop an atmospheric pressure on said chamber when the valve 85 is closed.

It is obvious that many changes in the details of construction and the manner of applying the control for the braking means may be made without departing from the spirit of the invention as set forth in the appended claims.

Having thus described the invention, what I claim as new and desire to secure by Letters-Patent, is—

1. A motor vehicle having a foot-operated accelerator lever for controlling the motive power, a clutch through which the vehicle is operated from the motive power, a braking means for the vehicle, a chamber on which a vacuum may be placed, a movable member controlled by the vacuum on said chamber for actuating the braking means, means for connecting said chamber to the intake manifold including a control valve having a main shiftable valve member and an auxiliary shiftable valve member for determining independently the degree of vacuum on said chamber, manual means for shifting said main valve member, and means controlled by said accelerator lever for shifting said auxiliary member.

2. A motor vehicle having a foot operated accelerator lever for controlling the motive power, a vacuum actuated braking means for the vehicle, a valve for controlling the operation of said braking means, a clutch through which the vehicle is operated from the motive power, a vacuum actuated device for releasing and applying the clutch and for shifting said control valve for the braking means whereby the brake may be applied and released, said device being timed for controlling the clutch and the braking mechanism in sequence, a valve for controlling the operation of said device, and means operated from the accelerator lever for controlling said last-named valve.

3. A motor vehicle having a foot operated accelerator lever for controlling the motive power, a vacuum actuated braking means for the vehicle, a valve for controlling the operation of said braking means, a clutch through which the vehicle is operated from the motive power, a vacuum actuated device for releasing and applying the clutch and for shifting said control valve for the braking means whereby the brake may be applied and released, said device being timed for controlling the clutch and the braking mechanism in sequence, a valve for controlling the operation of said device, means operated from said accelerator lever for controlling said last-named valve, and a connection between said accelerator lever and the motive power including a lost-motion connection, whereby when the accelerator lever is released for upward movement, said motive power will be brought to idling position, the clutch subsequently released and the brake applied subsequent to the releasing of the clutch, and whereby when said accelerator lever is moved downward, said brake will be released, the clutch subsequently applied and the motive power accelerated subsequent to the closing of the clutch.

4. A motor vehicle having a foot operated accelerator lever for controlling the motive power, a braking means for the vehicle, a clutch through which the vehicle is operated from the motive power, a cylinder having a pipe adapted to be placed under vacuum, a valve in said pipe, a piston in said cylinder, a device operated by said piston for controlling the opening and closing of the clutch, a vacuum actuated device for applying and releasing the brake, a valve controlling said last-named device, means connected to said piston for shifting said last-named valve, said means being timed so as to operate the clutch and the brake in sequence, and means operated from said accelerator lever for controlling the valve in the pipe leading to the cylinder, said last-named means including a device whereby when said accelerator lever is given one range of movement, the motive power will be controlled thereby without affecting the control means for the clutch or the brake, and whereby when said accelerator lever is given a different range of movement, the clutch and the brake will be operated in sequence without affecting the action of the motive power.

5. A motor vehicle having a foot-operated accelerator lever for controlling the motive power, a clutch through which the vehicle is operated from the motive power, a braking means for the vehicle, a chamber on which a vacuum may be placed, a movable member controlled by the vacuum on said chamber for actuating the braking means, means for connecting said chamber to the intake manifold including a control valve having a main shiftable valve member and an auxiliary shiftable valve member for determining independently the degree of vacuum on said chamber, manual means for shifting said main valve member, and means controlled by said accelerator lever for shifting said auxiliary member, said means for shifting said auxiliary valve member operating to release and apply the brake.

6. A motor vehicle having a foot-operated accelerator lever for controlling the motive power, a clutch through which the vehicle is operated from the motive power, a braking means for the vehicle, a chamber on which a vacuum may be placed, a movable member controlled by the vacuum on said chamber for actuating the braking means, a connection between said vacuum chamber and the intake manifold including a control valve having a main shiftable valve disk and an auxiliary shiftable valve disk, said valve disks operating independently for controlling the vacuum on said chamber, a brake pedal connected to said main valve disk for shifting the same, a clutch shifting shaft connected to said clutch, a chamber on which a vacuum may be placed, a movable member associated therewith and connected to said shaft for actuating the same, means for connecting said shaft to said auxiliary disk for shifting the same to apply the brakes when the clutch is moved to open position, a connection between said last-named vacuum chamber and the intake manifold including a valve, and means connected with the accelerator lever for shifting said last-named valve.

7. A motor vehicle having a foot-operated accelerator lever for controlling the motive power, a clutch through which the vehicle is operated from the motive power, a braking means for the vehicle, a chamber on which a vacuum may be placed, a movable member controlled by the vacuum on said chamber for actuating the braking means, a connection between said vacuum chamber and the intake manifold including a control valve having a main shiftable valve disk and an auxiliary shiftable valve disk, said valve disks operating independently for controlling the vacuum on said chamber, a brake pedal connected to said main valve disk for shifting the same, a clutch shifting shaft connected to said clutch, a chamber on which a vacuum may be placed, a movable member associated therewith and connected to said shaft for actuating the same, means for connecting said shaft to said auxiliary disk for shifting the same to apply the brakes when the clutch is moved to open position, a connection between said last-named vacuum chamber and the intake manifold including a valve, means connected with the accelerator lever for shifting said last-named valve, and means for varying the degree of vacuum placed on said chamber controlling the braking means by the shifting of the auxiliary disk whereby the brake pressure resulting from the automatic shifting of said disk may be less than the maximum brake pressure which may be applied to the braking means through the operation of the main valve disk.

8. A motor vehicle having a foot-operated accelerator lever for controlling the motive power, a clutch through which the vehicle is operated from the motive power, a braking means for the vehicle, a chamber on which a vacuum may be placed, a movable member controlled by the vacuum on said chamber for actuating the braking means, a connection between said vacuum chamber and the intake manifold including a control valve having a main shiftable valve disk and an auxiliary shiftable valve disk, said valve disks operating independently for controlling the vacuum on said chamber, a brake pedal connected to said main valve disk for shifting the same, a clutch shifting shaft connected to said clutch, a chamber on which a vacuum may be placed, a movable member associated therewith and connected to said shaft for actuating the same, means for connecting said shaft to said auxiliary disk for shifting the same to apply the brakes when the clutch is moved to open position, a valve in the connection between the control valve and the intake manifold, and means for connecting said last-named valve to the accelerator lever so that said last-named valve may be closed or opened under the control of the accelerator lever and the clutch actuating means operated for releasing the clutch without applying the braking means.

9. A motor vehicle having a foot-operated accelerator lever for controlling the motive power, a clutch through which the vehicle is operated from the motive power, a braking means for the vehicle, a chamber on which a vacuum may be placed, a movable member controlled by the vacuum on said chamber for actuating the braking means, a connection between said vacuum chamber and the intake manifold including a control valve having a main shiftable valve disk and an auxiliary shiftable valve disk, said valve disks operating independently for controlling the vacuum on said chamber, a brake pedal connected to said main valve disk for shifting the same, a clutch shifting shaft connected to said clutch, a chamber on which a vacuum may be placed, a movable member associated therewith and connected to said shaft for actuating the same, means for connecting said shaft to said auxiliary disk for shifting the same to apply the brakes when the clutch is moved to open position, a valve in the connection between the control valve and the intake manifold, and means for connecting said last-named valve to the accelerator lever so that said last-named valve may be closed or opened under the control of the accelerator lever and the clutch actuating means operated for releasing the clutch without applying the braking means, said last-named valve including a vent to the atmosphere whereby while the clutch is open, the brake pressure controlled by the auxiliary disk may be applied and released at will.

FREDERICK L. SHELOR.